US009499407B2

(12) United States Patent
Sailor et al.

(10) Patent No.: US 9,499,407 B2
(45) Date of Patent: Nov. 22, 2016

(54) CARBON AND CARBON/SILICON COMPOSITE NANOSTRUCTURED MATERIALS AND CASTING FORMATION METHOD

(75) Inventors: Michael J. Sailor, La Jolla, CA (US); Timothy Kelly, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 610 days.

(21) Appl. No.: 13/824,125

(22) PCT Filed: Sep. 29, 2011

(86) PCT No.: PCT/US2011/053965
§ 371 (c)(1), (2), (4) Date: Aug. 5, 2013

(87) PCT Pub. No.: WO2012/050966
PCT Pub. Date: Apr. 19, 2012

(65) Prior Publication Data
US 2013/0309484 A1 Nov. 21, 2013

Related U.S. Application Data

(60) Provisional application No. 61/387,566, filed on Sep. 29, 2010.

(51) Int. Cl.
*C01B 31/02* (2006.01)
*D01D 5/00* (2006.01)
(Continued)

(52) U.S. Cl.
CPC .............. *C01B 31/022* (2013.01); *B82Y 30/00* (2013.01); *B82Y 40/00* (2013.01); *C01B 31/0226* (2013.01);
(Continued)

(58) Field of Classification Search
CPC .............. Y10T 428/24802; Y10T 428/24893; Y10T 428/24917; Y10T 428/249994; B82Y 30/00; B82Y 40/00; C01B 31/0226; C01B 31/0246
See application file for complete search history.

(56) References Cited

U.S. PATENT DOCUMENTS

| 6,232,706 B1 * | 5/2001 | Dai | B82Y 10/00 313/309 |
| 7,042,570 B2 * | 5/2006 | Sailor | G01N 21/55 356/445 |

(Continued)

OTHER PUBLICATIONS

Xu et al. "Controlling growth and field emission property of aligned carbon nanotubes on porous silicon substrates", Appl. Phys. Lett., 1999, vol. 75, p. 481-483.*

(Continued)

*Primary Examiner* — Gerard Higgins
(74) *Attorney, Agent, or Firm* — Greer, Burns & Crain, Ltd.; Steven P. Fallon

(57) ABSTRACT

The invention provides nanostructure composite porous silicon and carbon materials, and also provides carbon nanofiber arrays having a photonic response in the form of films or particles. Composite materials or carbon nanofiber arrays of the invention are produced by a templating method of the invention, and the resultant nanomaterials have a predetermined photonic response determined by the pattern in the porous silicon template, which is determined by etching conditions for forming the porous silicon. Example nanostructures include rugate filters, single layer structures and double layer structures. In a preferred method of the invention, a carbon precursor is introduced into the pores of a porous silicon film. Carbon is then formed from the carbon precursor. In a preferred method of the invention, liquid carbon-containing polymer precursor is introduced into the pores of an porous silicon film The precursor is thermally polymerized to form a carbon-containing polymer in the pores of the porous silicon film, which is then thermally carbonized to produce the nano structured composite material. A carbon nanofiber array is obtained by dissolving the porous silicon. A carbon nanofiber array can be maintained as a film in liquid, and particles can be formed by drying the material.

20 Claims, 14 Drawing Sheets

(51) Int. Cl.

| | | |
|---|---|---|
| *D01F 9/14* | (2006.01) | |
| *G02B 1/00* | (2006.01) | |
| *B82Y 30/00* | (2011.01) | |
| *B82Y 40/00* | (2011.01) | |
| *B82B 1/00* | (2006.01) | |

(52) U.S. Cl.
CPC ............. *C01B 31/0246* (2013.01); *D01D 5/00* (2013.01); *D01F 9/14* (2013.01); *G02B 1/005* (2013.01); *B82B 1/00* (2013.01); *Y10T 428/249994* (2015.04); *Y10T 428/2918* (2015.01)

(56) References Cited

U.S. PATENT DOCUMENTS

| 7,375,366 B2* | 5/2008 | Ohki | B82Y 10/00 257/10 |
|---|---|---|---|
| 7,713,778 B2 | 5/2010 | Li et al. | |
| 2009/0029256 A1 | 1/2009 | Mah et al. | |

OTHER PUBLICATIONS

Fan et al. "Self-oriented regular arrays of carbon nanotubes and their field emission properties", Science, 1999, vol. 283, p. 512-514.*
Kempa, K., et. al. "Photonic crystals based on periodic arrays of aligned carbon nanotubes", Nano Letters, 2003, vol. 3, No. 1, pp. 13-18.
Rehmmar, R., et. al. "Nanowire-based tunable photonic crystals", Optics Express, Dec. 22, 2008, vol. 16, No. 26, pp. 21682-21691.
Wang, Kaixue, et. al., "Direct fabrication of well-aligned free-standing mesoporous carbon nanofiber arrays on silicon substrates", J. Am. Chem. Soc., 2007, vol. 129, No. 44, pp. 13388-13389.
Allock, P., et al. "Time-resolved sensing of organic vapors in low modulating porous silicon dielectric mirrors", Journal of Applied Physics, Vo., 90, No. 10, Nov. 15, 2001, pp. 5052-5057.
Bertarione, S. et al., "Furyfuryl Alcohol Polymerization in H-Y Confined Spaces: Reaction Mechanism and Structure of Carbocationic Intermediates", J. Phys. Chem. B., (2008), 112, pp. 2580-2589.
Berger, M. et al., "Dielectric filters made of PS: advanced performance by oxidation and new layer structures", 297 (1995) pp. 237-240.
Buriak, Jillian M., "Organometallic Chemistry on Silicon and Geranium Surfaces", Chem. Rev., May 2002, vol. 102, No. 5, pp. 1271-1308.
Che, G. L., et al., "Carbon nanotube membranes for electrochemical energy storage and production", Nature, May 28, 1998, vol. 393, pp. 346-349.
Ferrari, A.C., et al., "Interpretation of Raman spectra of disordered and amorphous carbon", Physical Review B, vol. 61, No. 20, May 15, 2000, pp. 14095-14107.
Fortas, G., et al., "Electroless depsoition study of silver into porous silicon" Surf. Interface Anal., (2006), 38, pp. 808-810.
Gao, Jun et al., "Porous-silicon vapor sensor based on laser interferometry", App. Phys. Lett., vol. 77, No. 6, Aug. 7, 2000, pp. 901-903.
Gao, Jun et al., "Vapor Sensors Based on Optical Interferometry from Oxidized Microporous Silicon Films", Langmuir, (2002), 18, pp. 2229-2233.
Gao, Jun et al., "Tuning the Response and Stability of Thin Film Mesoporous Silicon Vapor Sensors by Surface Modification", Langmuir, (2002) 18, pp. 9953-9957.
Han, Moon Gyu, et al., "1-Dimensional structures of polu(3,4-ethylenedioxythiophene) (PEDOT): a chemical route to tubes, rods, thimbles, and belts", Chem. Comm., (2005), pp. 3092-3094.
Hsieh, Kun-Che, et al., Iridescence of Patterned Carbon Nanotube Forests on Flexible Substrates From Darkest Materials to Colorful Films ACS NANO, (2010) vol. 4, No. 3, pp. 1327-1336.

Janshoff, Andreas, et al. "Macroporous p-Type Silicon Fabry-Perot Layers. Fabrication, Characterization, and Applications in Biosensing", J. Am. Chem. Soc., (1998), 120, pp. 12108-12116.
King, Brian et al., "Optical-Fiber-Mounted Porous Silicon Photonic Crystals for Sensing Organic Vapor Breakthrough in Activated Carbon", Adv. Mater., (2007), 19, pp. 4530-4534.
Lehmann, Volker, et al., Electrochemistry of Silicon: Instrumentation, Science, Materials, and Applications., Wiley-VCH, Weinheim, Germany, (2002) 283 pags.
Li, Yang Yang et al., "Preparation of Cadmium Sulfide Nanowire Arrays in Anodic Aluminum Oxide Templates" Chem Mater., (1999), 11, pp. 3433-3435.
Li, Yang Yang, et al., "Polymer Replicas of Photonic Porous Silicon for Sensing and Drug Delivery Applications" Science, vol. 299, Mar. 28, 2003, pp. 2045-2047.
Link, Jamie R., et al., "Smart dust: Self-assembling, self-orienting photonic crystals of porous Si", PNAS, Sep. 16, 2003, vol. 100, No. 19, pp. 10607-10610.
Mao, Yuanbing et al., "Ambient Template-Directed Synthesis of Single-Crystalline Alakaline-Earth Metal Fluoride Nanowires" Adv. Mater., (2006) 18, pp. 1895-1899.
Martin, C.R., "Nanomaterials: A Membrane-Based Synthetic Approach", Science, vol. 266, Dec. 23, 1994, pp. 1961-1966.
Martin, C. R., "Membrane-Based Synthesis of Nanomaterials", Chem. Mater. (1996). 8, pp. 1739-1746.
Meade, Shawn O., et al., "Porous Silicon Photonic Crystals as Encoded Microcarriers", Adv. Mater., Oct. 18, 2004, 16. No. 20, pp. 1811-1814.
Nakamura, Tadashi et al. "Monodispersed nanoporous starburst carbon spheres and their three-dimensionally ordered arrays" Microporous and Mesoporous Materials, 117 (2009) pp. 478-485.
Nishizawa, Matsuhiko, et al. "Metal Nanotube Membranes with Electrochemically Switchable Ion-Transport Selectivity".
Perpall, Mark, et al., "Novel Network Polymer for Templated Carbon Photonic Crystal Structures" Langmuir, Aug. 7, 2003, 19, pp. 7153-7156.
Qu, Xue, et al., "Protein Nanotubes Comprised of an Alternate Layer-by-Layer Assembly Using a Polycation as an Electrostatic Glue", Chem. Eur. J., (2008), 14, pp. 10303-10308.
Rakow, Neal A., et al. "Visual Indicator for Trace Organic Volatiles" Langmuir, Feb. 18, 2010, 26(6), pp. 3767-3770.
Ruminiski, Anne, et al. "Humidity-Compensating Sensor for Volatile Organic Compounds Using Stacked Porous Silicon Photonic Crystals", Adv. Funct. Mater., (2008), 18, pp. 3418-3426.
Ruminiski, Anne, et al., "Porous Silicon-Based Optical Microsensors for Volatile Organic Analytes: Effect on Surface Chemistry on Stability and Specificity", Adv. Funct. Mater., (2010), 20, pp. 2874-2883.
Sailor, Michael J., "Color Me Sensitive: Amplification and Discrimination in Photonic Silicon Nanostructures", ACS Nano, vol. 1, No. 4, (2007), pp. 248-252.
Snow, , P. A., et al., "Vapor sensing using the optical properties of porous silicon Bragg mirrors", J. Appl. Phys., vol. 86, No. 4, Aug. 15, 1999, pp. 1781-1784.
Song, Jae Hee, et al., "Dimethyl Sulfoxide as a Mild Oxidizing Agent for Porous Silicon and Its Effects on Photoluminescence", Inorg. Chem., 1998, 37, pp. 3355-3360.
Vincent, G., "Optical properties of porous silicon superlattices", App. Phys. Lett., 64, 18, May 2, 1994.
Zakhidov, Anvar A., et al. "Carbon Structures with Three-Dimensional Periodicity at Optical Wavelengths", Science, vol. 282, Oct. 30, 1998, pp. 897-901.
Zarbin, Aldo, J.G., et al., "Preparation, characterization and pyrolysis of poly(furfuryla alcohol) / porous silica glass nanocomposites: novel route to carbon template", Carbon, 40, (2002), pp. 2413-2422.
Zhou, Hongjun, et al., "A Facile and Mild Synthesis of 1-D ZnO CuO and $\alpha Fe_2O_3$ Nanostructures and Nanostructured Arrays", ACS Nano, vol. 2, No. 5, pp. 944-958.

* cited by examiner

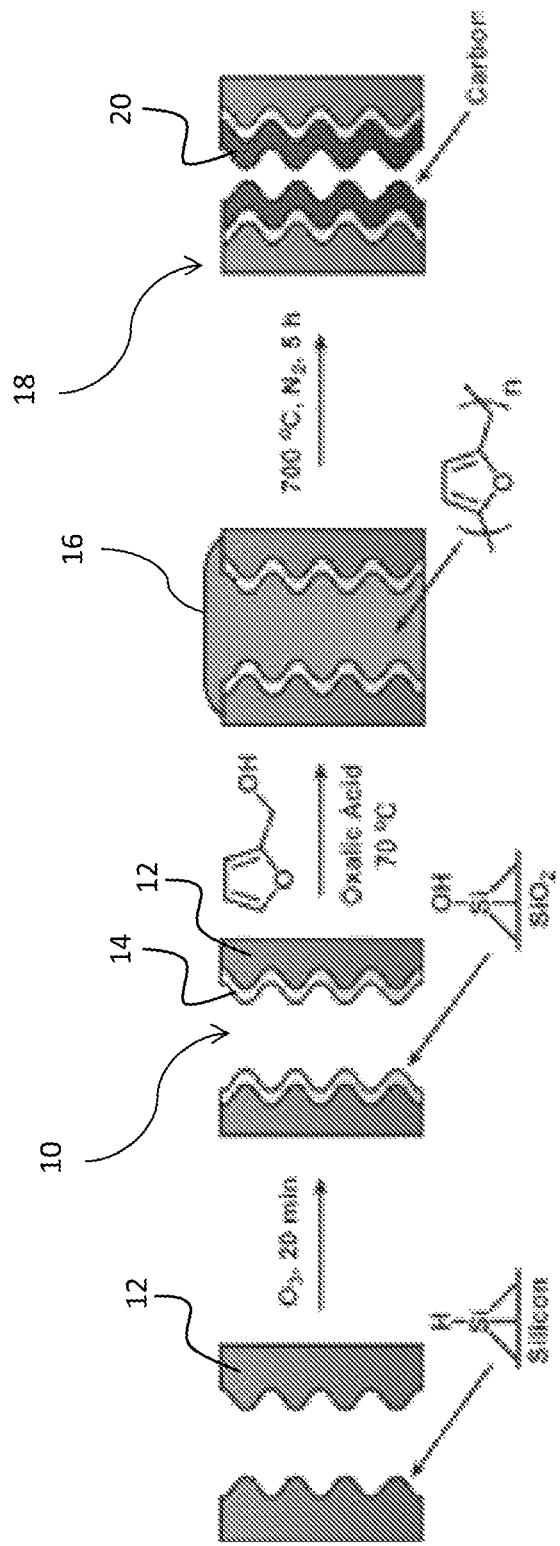

CARBON AND CARBON/SILICON COMPOSITE NANOSTRUCTURED MATERIALS AND CASTING FORMATION METHOD

PRIORITY CLAIM AND REFERENCE TO RELATED APPLICATION

The application claims priority under 35 U.S.C. §119 from prior provisional application Ser. No. 61/378,566, which was filed on Sep. 29, 2010.

STATEMENT OF GOVERNMENT INTEREST

This invention was made with government support under DMR-0806859 awarded by National Science Foundation. The government has certain rights in the invention.

FIELD

A field of the invention is carbon fiber composites and sensors, free-standing carbon nanostructures, carbon photonic sensors and fabrication methods for composite and free-standing nanostructured carbon. Example applications of composite and free standing nanostructured carbon include remote chemical sensing, air quality monitoring, water quality monitoring, biosensors, pre-concentrators, electrode materials (e.g., for Li-ion batteries or supercapacitors), field-emission arrays, electromagnetic shielding components.

BACKGROUND

Previous generations of sensors for chemical or biological compounds based on porous silicon photonic crystals possess surface functionality that only weakly interacts with non-polar organic compounds. For example, freshly prepared porous silicon possesses a silicon hydride terminated surface; however, this surface is not environmentally stable and it does not provide strong adsorption sites for many organic molecules. Oxidation of the silicon matrix yields hydrophilic surfaces with strong adsorption properties for alcohols and water, but not for non-polar organic compounds. These adsorption characteristics place a fundamental limit on the sensitivity of the device. Previously reported chemical modification reactions for porous silicon surfaces suffer from incomplete coverage and poor thermal or environmental stability.

Previous methods of templated nanowire and nanotube formation have used anodized aluminum oxide and etched polymer templates. See, Martin, C. "Nanomaterials: A Membrane-Based Synthetic Approach," Science, Vol. 266, no. 5193, pp. 1961-66 (1994). The membranes in Martin's work contained cylindrical pores of uniform diameter, and were used to prepare polymers, metals, semiconductors, and other materials on a nanoscopic scale. This initial work was extended by others to produce nanowires and nanotubes of metals, metal oxides, conjugated polymers, inorganic salts, proteins, and metal chalcogen semiconductors. See, e.g., Nishizawa, M.; Menon, V. P.; Martin, C. R. "Metal Nanotubule Membranes with Electrochemically Switchable Ion-Transport Selectivity," Science, 268, 700-702 (1995); F. Zhang, Y. Mao, T.-J. Park and S. S. Wong, "Green Synthesis and Property of Single-crystalline Alkaline Earth Metal Fluoride Nanowires," Adv. Mater. 18, 1895-1899 (2006).

SUMMARY OF THE INVENTION

The invention provides nanostructured composite porous silicon and carbon materials, and also provides carbon nanofiber arrays having a photonic response in the form of films or particles. Composite materials or carbon nanofiber arrays of the invention are produced by a templating method of the invention, and the resultant nanomaterials have a predetermined photonic response determined by the pattern in the porous silicon template, which is determined by etching conditions for forming the porous silicon. Example nanostructures include rugate filters, single layer structures and double layer structures. In a preferred method of the invention, a carbon precursor is introduced into the pores of a porous silicon film. Carbon is then formed from the carbon precursor. In a preferred method of the invention, liquid carbon-containing polymer precursor is introduced into the pores of an porous silicon film. The precursor is thermally polymerized to form a carbon-containing polymer in the pores of the porous silicon film, which is then thermally carbonized to produce the nanostructured composite material. A carbon nanofiber array is obtained by dissolving the porous silicon. A carbon nanofiber array can be maintained as a film in liquid, and particles can be formed by drying the material.

BRIEF DESCRIPTION OF THE DRAWINGS

FIG. 1-1D illustrates the resultant steps in a preferred method for forming a nanostructured materials of the invention including composite porous silicon-carbon materials and carbon nanofiber arrays;

DETAILED DESCRIPTION OF THE PREFERRED EMBODIMENTS

Figure 2A:
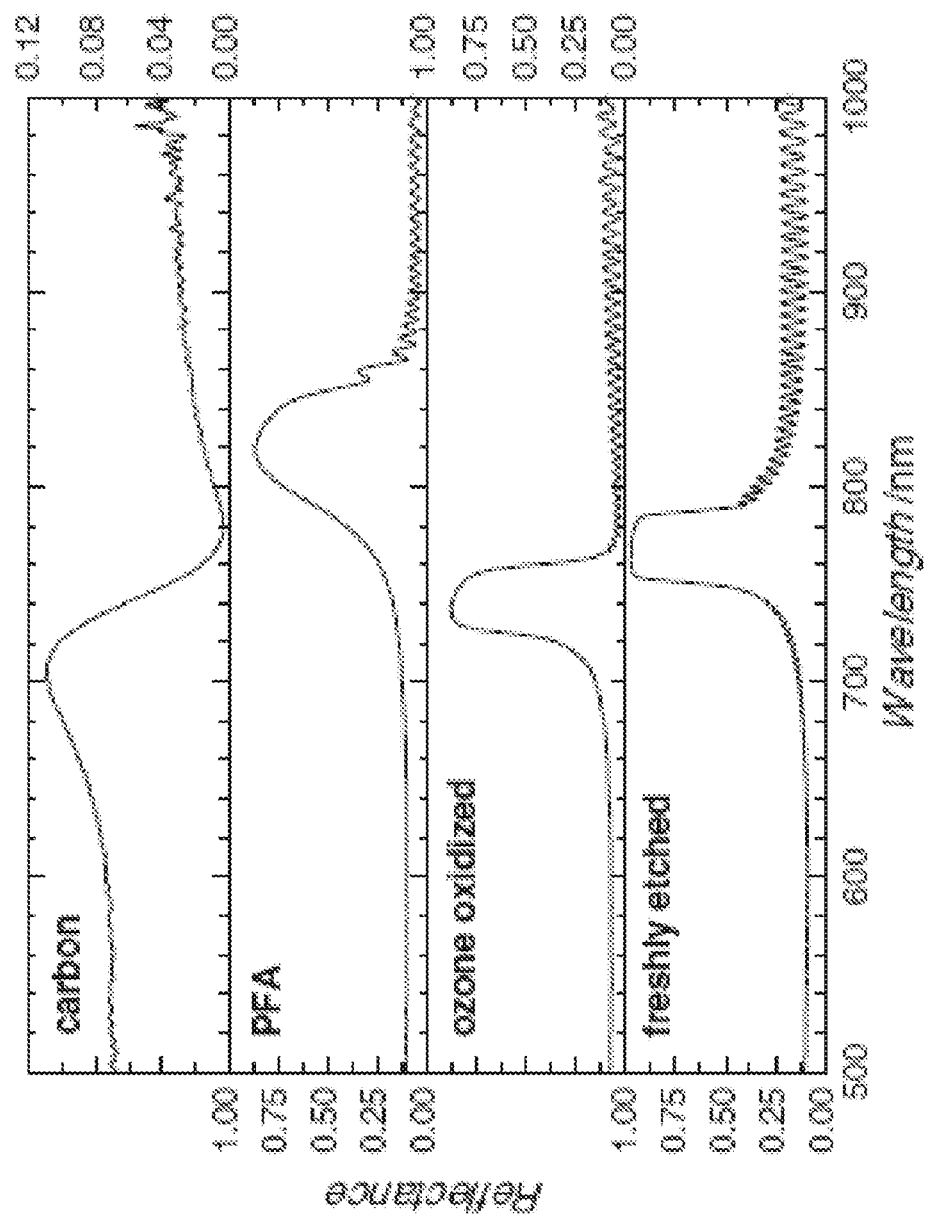
FIG. 2A shows reflectance spectra (from bottom to top) of the freshly etched, oxidized, poly(furfuryl alcohol) resin (PFA)-infiltrated, and carbon infiltrated composite films of the invention.

Preferred embodiment nanostructured materials of the invention include nanostructured carbon/silicon composites and carbon nanofiber arrays. Composites and carbon material of the invention can include photonic structures. Preferred embodiments methods of the invention synthesize nanostructured carbon inside the pores of a porous silicon template by a polymerization and carbonization procedure. In particular preferred embodiments, the porous silicon template is oxidized prior to the polymerization and carbonization procedure, though those procedures can also be conducted on freshly etched porous silicon. Free-standing nanofiber structured carbon can be obtained by dissolution of the porous silicon template. The carbon nanofibers adopt the shape and morphology of the porous silicon template, and can provide a photonic nanostructured material that is stable in liquid. Particles of nanostructured carbon are formed by drying the film. Carbon/silicon composite particles can also be formed by fracturing a composite film of the invention.

In preferred embodiments, the nanoporous template is nanoporous silicon having a predetermined porous nanostructure including an arbitrary, user-defined pore shapes with porous silicon. This is achieved by control of the etching conditions and the formation of multi-layer porous silicon structures. In an example formation method, by controlling porous silicon etching to make undulating pores, the ability to make undulated carbon nanowires within the pores has been demonstrated because the porous silicon system allows the generation of undulated pores. Such a process permits the fabrication, for example, of optical filters out of carbon nanowire structures.

Carbon/porous silicon composites are robust, surviving repeated thermal and organic vapor adsorption cycles. The carbon nanocasting approach creates surfaces that: (a) have increased affinity for non-polar organic molecules leading to 10× improvement in sensor sensitivity; (b) have increased surface area relative to the template leading to greater adsorbing capacity; (c) are very stable; and, (d) uniformly cover the underlying silicon layer. carbon nanostructured materials of the invention are stable as films in liquid, and form particles when removed from liquid. The particles retain the nanostructure, and can be used as carbon photonic sensors.

Additional examples of control of the porous silicon structures can be found, e.g., in Li et al. U.S. Pat. No. 7,713,778; Sailor U.S. Patent Publication No. 2007-0148695, published on Jun. 28, 2007; Sailor U.S. Patent Publication, 2005-0042764, published on Feb. 24, 2005; Sailor U.S. Patent Publication No. 2008-0145513, published on Jun. 19, 2008; & Sailor U.S. Patent Publication 2007-0051815, published on Mar. 8, 2007. Complex structures are available through fabrication methods in these patents and published applications, including multi-layer structures, Bragg stacks, rugate filters, and periodic structures, as in these named patents and published applications. Methods of the invention provide carbonized silicon/carbon composites in which the carbon fills pores, including pores throughout the depth of films and particles base upon such complex porous silicon nanostructures.

Preferred applications for the carbon/silicon composite include optical-based chemical/biological sensors, pre-concentrators for chemical/biological species in air/water samples, electrode materials (e.g., for Li-ion batteries, supercapacitors, or active information display elements) and optical components. The formed carbon can also be released to leave free-standing carbon nanofiber films in liquid and particles when removed from liquid that maintain characteristics of the composite template from which the array was released. Preferred applications for the freestanding carbon include field-emission arrays, electromagnetic shielding components, and porous electrode materials. An additional preferred application is for an end-of life sensor for an activated carbon respirator. A nanostructured silicon/carbon composite or carbon material has adsorption properties that are closely matched to the activated carbon in an activated carbon respirator, permitting the nanostructured material of the invention, to serve as an accurate end-of life indicator.

An advantage of using a porous silicon template to form a composite or a freestanding carbon nanofiber array is that the templates can be prepared with well-defined optical spectra (e.g., one-dimensional photonic crystals) and the resulting carbon materials take on photonic aspects of the structured template. Such a free-standing photonic carbon, nanofiber composite material forms an embodiment of the invention.

In preferred methods of formation, synthesis of structured carbon inside the pores of a porous silicon template is by the carbonization of a poly(furfuryl alcohol) precursor. The carbon adopts the shape and morphology of the porous silicon template. Synthesis of free-standing nanofiber arrays is accomplished by dissolution of the porous silicon template and the released carbon coalesces into carbon nanofiber arrays.

Porous silicon/carbon nanofiber composites of the invention behave as a sensitive, robust sensor for volatile organic compounds. Experiments showed a limit of detection (LOD) for toluene and isopropanol of 1 ppmv and 3 ppmv, respectively. These are lower detection limits than those obtained for either freshly etched porous silicon ($LOD_{toluene}$=21 ppmv, $LOD_{IPA}$=9 ppmv) or ozone-oxidized ($LOD_{toluene}$=11 ppmv, $LOD_{IPA}$=3 ppmv) control samples. The composite sensor is capable of being thermally refreshed by heating above 100° C. in an analyte-free atmosphere.

Preferred embodiments of the invention will now be discussed with respect to the drawings and with respect to experiments that have demonstrated preferred embodiments of the invention. The drawings may include schematic representations, which will be understood by artisans in view of the general knowledge in the art and the description that follows. Features may be exaggerated in the drawings for emphasis, and features may not be to scale. Artisans will appreciate broader aspects of the invention from the following discussion of experiments and specific embodiments.

FIGS. 1A-1D illustrates the resultant steps in a preferred method for forming a nanostructured materials of the invention. FIG. 1A is a schematic representation of a single pore 10 in a nanostructured porous film 12, while artisans will understand that a porous silicon film can have a variety of single layer, double layer, periodic and complex structures photonic structures determined by the specific etching conditions used during formation of the film. In FIG. 1B, the film 12 is oxidized which creates OH terminations 14 in pore surfaces. A polymerization is conducted in FIG. 1C to fill pores 10 of the film 12 with a carbon precursor. In preferred embodiments, the polymerization is conducted by introducing oxalic acid in furfuryl alcohol into the pores 10 of the silicon film 12 and then thermally polymerizing the furfuryl alcohol. In FIG. 1D, the polymerized carbon precursor 16 is carbonized to form carbon/silicon nanostructured material 18 in FIG. 1D. The nanostructure material includes carbon 20 that follows the shape of the pores 10 in the film. Experiments have shown that the carbon forms and penetrates throughout even complex multi-layer porous films. Dissolution of the silicon template generates freestanding carbon nanofiber arrays, which are patterned according to the silicon template. Upon drying, adjacent carbon nanofibers coalesce into thicker bundles, leading to a loss of free volume and produce cracking of the carbon membrane, which can form particles of carbon nanofibers.

In example experimental formation methods, porous silicon optical rugate filters were electrochemically etched by the application of a sinusoidally varying current density to highly doped (ρ=0.9-1.0 mΩcm), p-type, (100)-oriented silicon wafers. The etching solution was 3:1 HF:EtOH (v/v) electrolyte solution. The porous silicon films were approximately ~35 μm thick. The thickness was determined by cross-sectional scanning electron microscopy measurements. The porous silicon films were oxidized by exposure to a stream of ozone for 20 min. This oxidation treatment provides a porous silicon oxide surface with a high percentage of terminal silanol functionality.

Pores in experiments were filled with a solution of oxalic acid in furfuryl alcohol (5 mg mL$^{-1}$) as polymer precursors. This was accomplished by immersing the oxidized porous silicon template in the solution. Excess solution was wiped away from the top prior to thermal polymerization. The furfuryl alcohol was then thermally polymerized at 70° C. for 16 h. Carbonization of the poly(furfuryl alcohol) resin (PFA) is then carbonized at 700° C. for 5 h under flowing (1.2 SLPM) nitrogen. The furnace was purged with nitrogen for 30 minutes, and then heated to 700° C. Samples were cooled to room temperature under flowing nitrogen. After cooling, samples were rinsed by immersion in a bath of anhydrous ethanol. This yields the porous silicon/carbon composite. Free-standing carbon nanofiber arrays can be liberated from the template by soaking in a solution of 4:1:1(v/v) dimethylsulfoxide:concentrated (49%) aqueous hydrofluoric acid:ethanol for 4 h to dissolve the silicon matrix. The freed carbon nanofiber array film is stable in liquid, and cracks into particles when dried.

Experiments have shown that the carbon/silicon nanostructure material has greatly enhanced sensitivity compared to porous silicon for volatile organic contaminants. The reflectance spectra (from bottom to top) of the freshly etched, oxidized, PFA-infiltrated, and carbon infiltrated composite films are shown in FIG. 2A. Reflectance spectra were acquired using a tungsten lamp (Ocean Optics LS-1) and spectrometer (Ocean Optics USB4000) attached to a bifurcated fiber optic cable. The spectra were referenced to a front-surface silver mirror with Rs≥96%. The freshly etched porous silicon sample displays a broad, rectangular stop band from the optical rugate filter centered at 770 nm. While the position of the stop band shifts upon both oxidation and PFA infiltration, due to changes in the effective refractive index ($n_{eff}$) of the film, the intensity of the band is relatively constant (approaching 100% reflectance). After carbonization, the line shape of the stop band is significantly altered, its intensity is reduced to ~10% and Fabry-Pérot interference fringes are no longer visible in the reflectance spectrum. For optical sensing using the silicon-carbon composite film, the photonic stop band is used because there is no interference pattern. These spectral changes are attributed to the high absorption cross-section of the carbon present in the film. The fact that the interference fringes are no longer visible implies that the incident light is either reflected or absorbed before it can reach the film/substrate interface and produce an interfering wave to generate the Fabry-Pérot interference pattern.

Figure 2B:
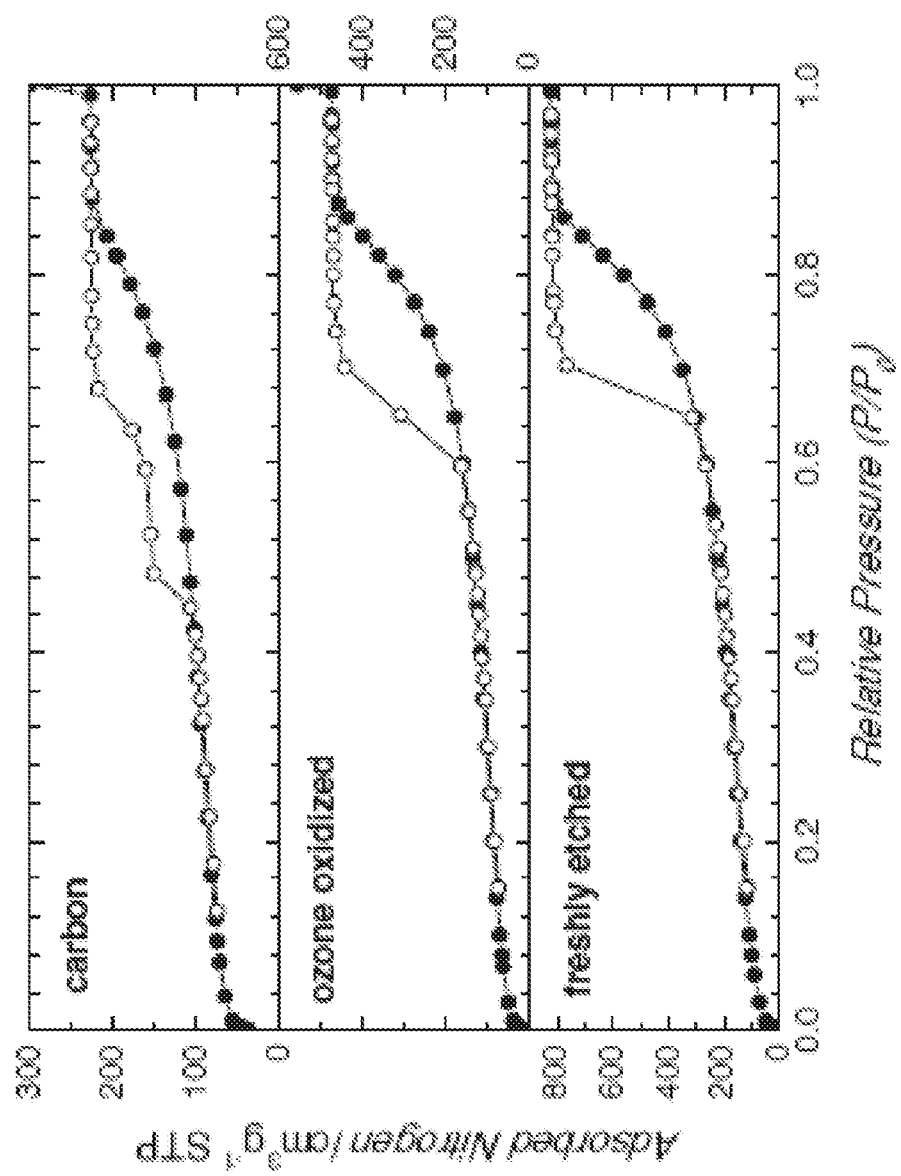
FIG. 2B shows the porosity of the samples at the various stages of synthesis.

FIG. 2B shows the porosity of the samples at the various stages of synthesis. The porosity was determined by nitrogen adsorption analysis, and the isotherms are presented in FIG. 2B. In FIG. 2B, the adsorption branches of isotherms are solid circles and the desorption branches are open circles. The freshly etched sample displays a type IV isotherm typical of mesoporous materials, with a Brunauer-Emmett-Teller (BET) surface area of 479 m$^2$ g$^{-1}$. The BET surface area per geometric surface area is more relevant to porosity investigation and was measured as 0.93 m$^2$ cm$^{-2}$. Oxidation of the film does not greatly alter the porosity. There is a slight decrease in the mean Barrett-Joyner-Halenda (BJH) pore diameter (from 7.5 to 7.2 nm), and a slight increase in the BET surface area to 0.97 m$^2$ cm$^{-2}$. In contrast, carbon nanofiber incorporation changes the s adsorption properties markedly, as seen in FIG. 2B. The mean BJH pore diameter is reduced to 6.2 nm, while the BET surface area increases to 1.39 m$^2$ cm$^{-2}$. Additionally, the desorption isotherm indicates a two step desorption process. This may indicate the presence of two distinct classes of pores within the sample, due to either high and low local concentrations of carbon or to separate carbon and porous silicon microdomains. The origin of the steps in the desorption branch cannot be determined with certainty from the data. Raman spectroscopy revealed peaks at 1313 and 1578 cm$^{-1}$, consistent with the D and G bands of carbon, and the observed position of the G band was consistent with a high percentage of sp$^2$ hybridization and known spectra for carbon samples formed from PFA precursors. See, e.g., Rodil et al., "Raman and Infrared Modes of Hydrogenated Amorphous Carbon Nitride," J. Appl. Phys. 89, 5425 (2001).

Figure 3A:
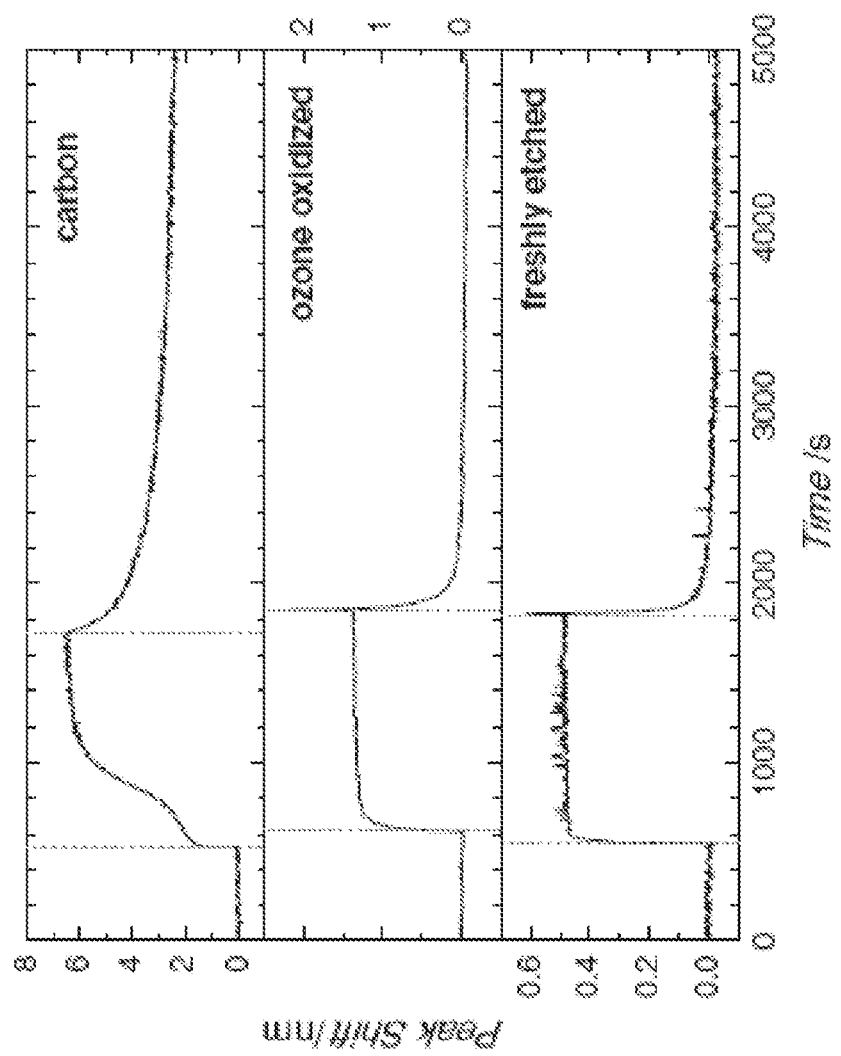
FIGS. 3A-3D characterize the optical response to toluene vapor (FIGS. 3A & 3B) and isopropanol (FIGS. 3C and 3D) of freshly etched, oxidized, and carbon composite porous silicon of the invention.
Figure 3B:
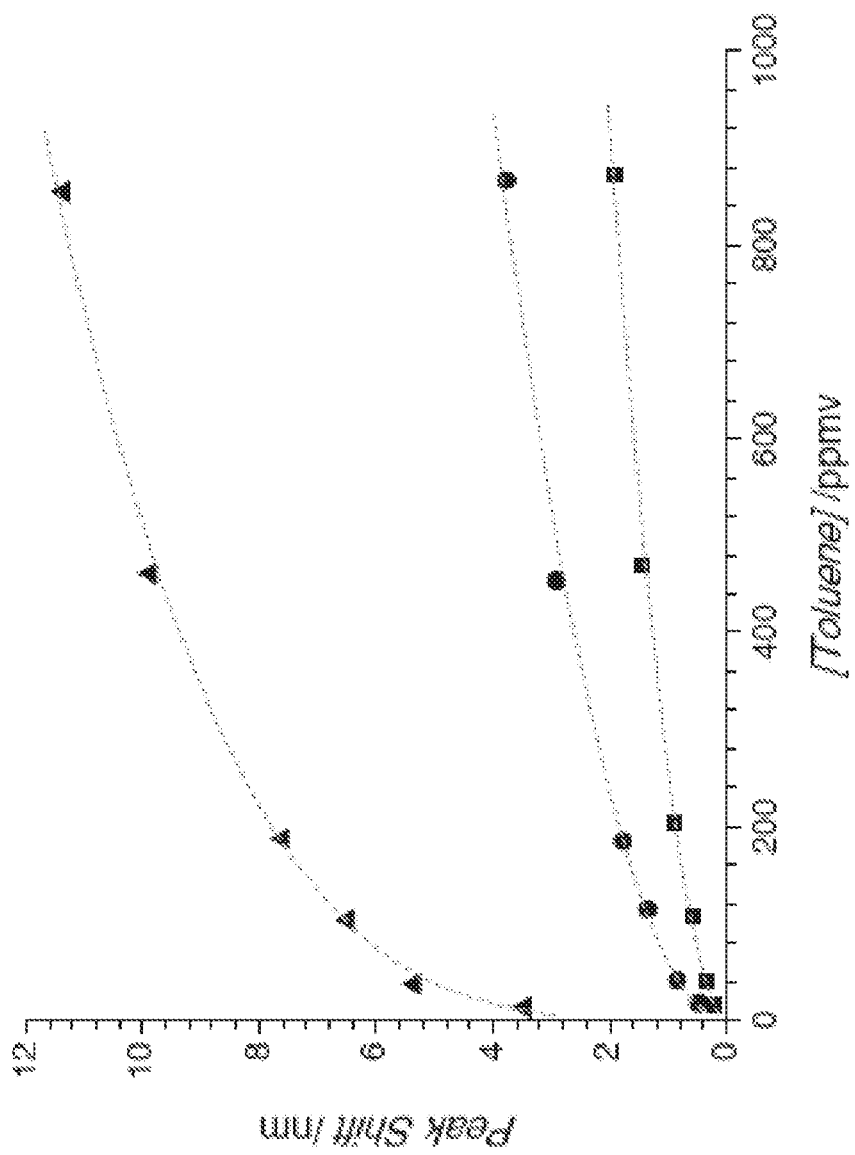
Figure 3C:
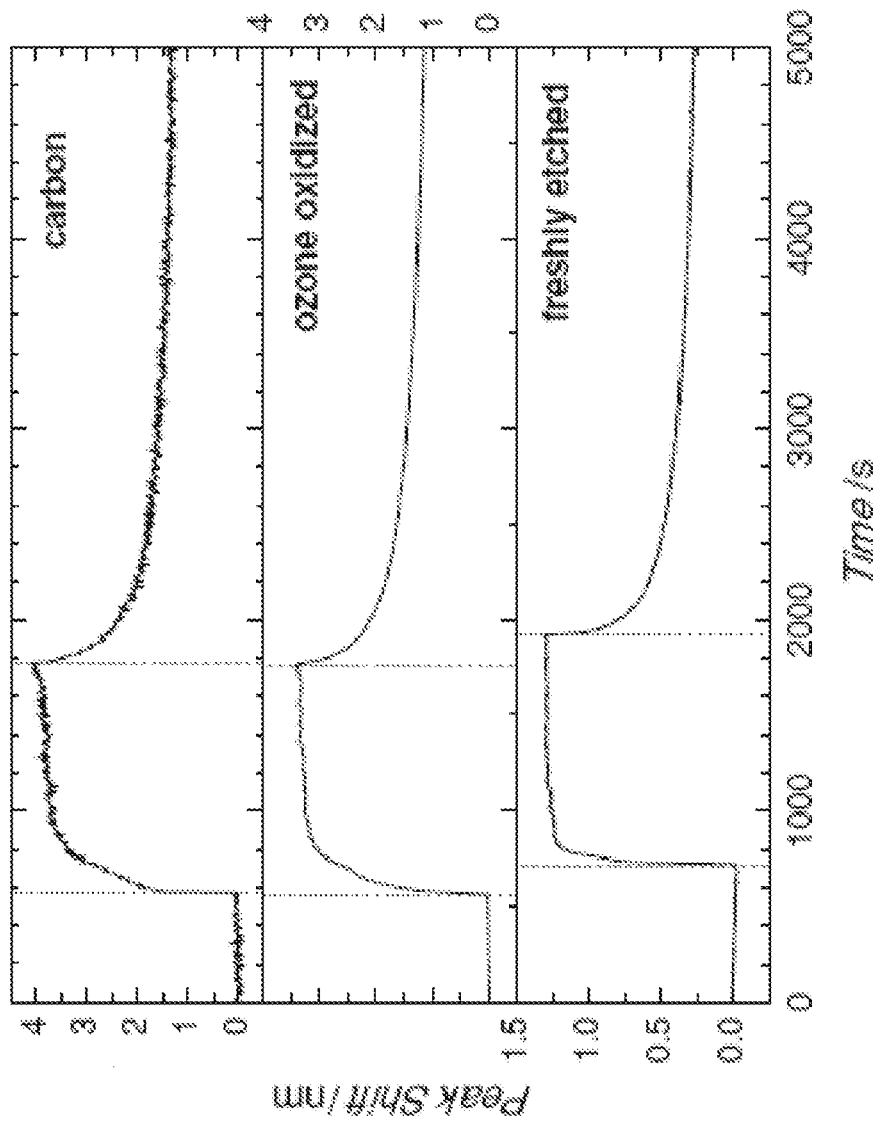
Figure 3D:
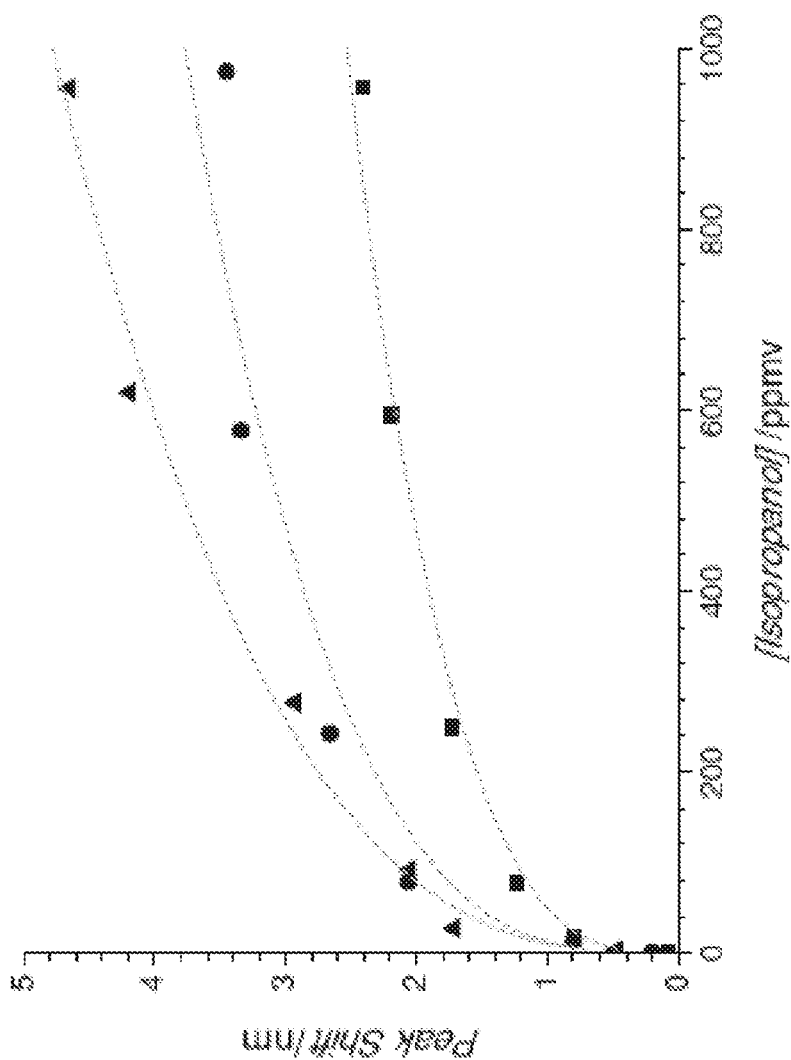

FIGS. 3A-3D characterize the optical response to toluene vapor of freshly etched, oxidized, and carbon composite porous silicon of the invention, respectively from bottom to top (as marked). Vapor response was obtained in a Teflon flow cell with an insulated copper back-plate, and a resistive heater was attached to the plate and to the silicon and composite materials tested. Organic vapors were produced by bubbling nitrogen carrier gas through a coarse glass fit immersed in a thermostated reservoir of liquid analyte, and the saturated vapor flow was diluted with pure nitrogen. The reflectance spectrum of the rugate film (normalized to a silicon mirror) was monitored through an optical window in the cell. In FIG. 3A, the peak wavelength of the photonic stop band was monitored as a function of time as each sample is exposed to a pulse of 120 ppmv of toluene vapor in pure nitrogen. The dashed gray lines mark the beginning and end of the toluene pulse. The data are presented as the shift (in nm) of the stop band relative to its value in pure nitrogen. Positive values indicate a spectral red-shift to longer wavelength. FIG. 3B shows dose-response curves for samples from 3A as a function of toluene concentration: freshly etched (squares), ozone oxidized (circles), and carbon composite (triangles). The dashed lines are included as a guide to the eye. FIGS. 3C and 3D correspond to FIGS. 3A and 3B, but the data was taken with 180 ppmv isopropanol vapor in nitrogen carrier gas as the analyte.

FIGS. 3A-3B indicate that the composite shows a five-fold increase in sensitivity compared to the ozone oxidized sample for toluene. The magnitude of the peak shift (~7 nm) is an order of magnitude larger than the shift observed for the freshly etched sample, and it is a five-fold or more increase relative to the ozone oxidized porous silicon film. The response of the carbon-based sensor is 5-10× that of the ozone-oxidized chip across the concentration range tested. Also, on purging the sensor with pure nitrogen, the position of the stop band does not return to its original baseline value. This indicates that there is residual toluene adsorbed in the film. The apparent adsorption strength of toluene on the porous surface increases in the order: fresh porous silicon<ozone-oxidized<<carbon-porous silicon. The approximate detection limits of each of the sensors can be extrapolated based on the data in FIG. 3B. These were found to be 21, 11, and 1 ppmv for the freshly etched, oxidized, and composite carbon-porous silicon sensors. Despite the higher affinity of toluene for the carbonized surface, the composite carbon-porous silicon sensor can nonetheless be returned to its original baseline value by heating the sample to 110° C. over 20 min.

FIGS. 3C-3D also show a good sensitivity for the detection of isopropanol with a carbon/silicon nanostructured composite of the invention, though lesser than for toluene. the higher affinity of isopropanol for the silicon hydride and silicon oxide surfaces (evidenced by the slow return to the baseline reading FIG. 3C results in greater sensitivity of the freshly etched and oxidized sensors toward isopropanol relative to toluene (FIG. 3D). The greater relative sensitivity toward isopropanol displayed by these two surface chemistries is attributed to hydrogen bonding between the alcohol and surface oxide species. The trend in sensor selectivity is reversed for the carbon nanofiber sample—it is more sensitive to toluene than it is to isopropanol. The isopropanol detection limit of the three sensor types was found to be 9, 3, and 3 ppmv for the freshly etched, ozone-oxidized, and carbon-infiltrated sensors, respectively.

Experiments were also conducted to verify the formation of carbon nanostructured material by dissolution of the silicon matrix. In the experiments, this was accomplished by immersion of the carbon-silicon composite in a 4:1:1 solution of DMSO:HF:EtOH. These precursors form glassy carbon. Other precursor materials known to artisans could provide graphitic carbon or amorphous carbon. Synthetic production of graphite is well known. The hydrofluoric acid dissolves the thin oxide layer formed during the ozonation process, and the ethanol reduces the surface tension of the mixture to ensure the penetration of the acid into the film. Dimethylsulfoxide acts as a mild oxidant for the remaining silicon in the film, converting it to silicon oxide and liberating dimethylsulfide. This oxide layer is then dissolved by the hydrofluoric acid. The dissolution of the silicon template was verified by energy dispersive X-ray microanalysis ($m_{Si}$~5%). Once the template is removed, the remaining carbon film is very brittle and fragments into particles. However, if the sample is kept immersed in liquid, the carbon membrane remains intact. The carbon film and particles were ~35 μm thick, in good agreement with the thickness of the porous silicon template, and demonstrates that the carbon penetrated throughout the thickness of the porous silicon template.

The intact membrane retains the pattern of the carbon porous silicon composite film. carbon particles also retain the nanostructure of the composite film. In experiments, a carbon photonic film was produced in liquid from a rugate filter carbon porous silicon composite. The resultant nanostructured carbon film had the periodic structure of an optical rugate filter. With the rugate filter template, the resultant carbon particles and film appear to consist of aligned carbon fibers ($d_{fiber}$~100 nm) of sinusoidally oscillating thickness. The period of this banded structure in the resultant carbon particles and films (T=210±30 nm) is the same, within error, of that of the porous silicon template (T=260±20 nm), indicating the high degree of fidelity with which the carbon replicates the structure of the template.

Figure 4A:
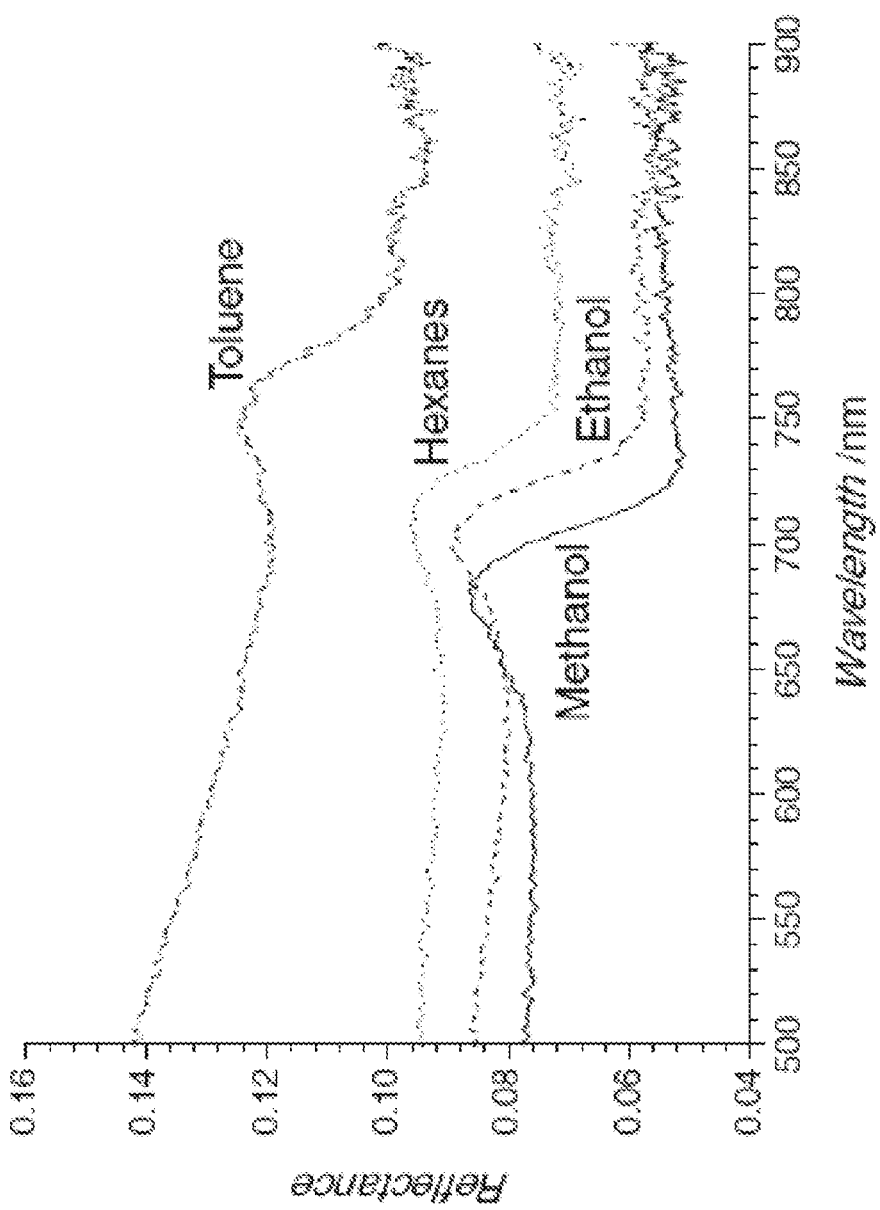
FIG. 4A shows reflectance spectra obtained in various immersion media for free-standing carbon nanofiber films of the invention that have been removed from a porous silicon photonic crystal template in methanol (solid line), ethanol (dashed line), hexanes (dotted line), and toluene (dashed-dotted line)

FIG. 4A shows reflectance spectra obtained in various immersion media for free-standing carbon nanofiber films that have been removed from a porous silicon photonic crystal template in methanol (solid line), ethanol (dashed line), hexanes (dotted line), and toluene (dashed-dotted line). Changing the refractive index of the immersion medium from methanol ($n_{MeOH}$=1.328) to ethanol ($n_{EtOH}$=1.361), hexanes ($n_{hexanes}$=1.375) and toluene ($n_{toluene}$=1.497) shifts the position of the reflection peak. This new material is an all-carbon photonic crystal, and it is a one-dimensional example, as seen by the response.

Figure 4B:
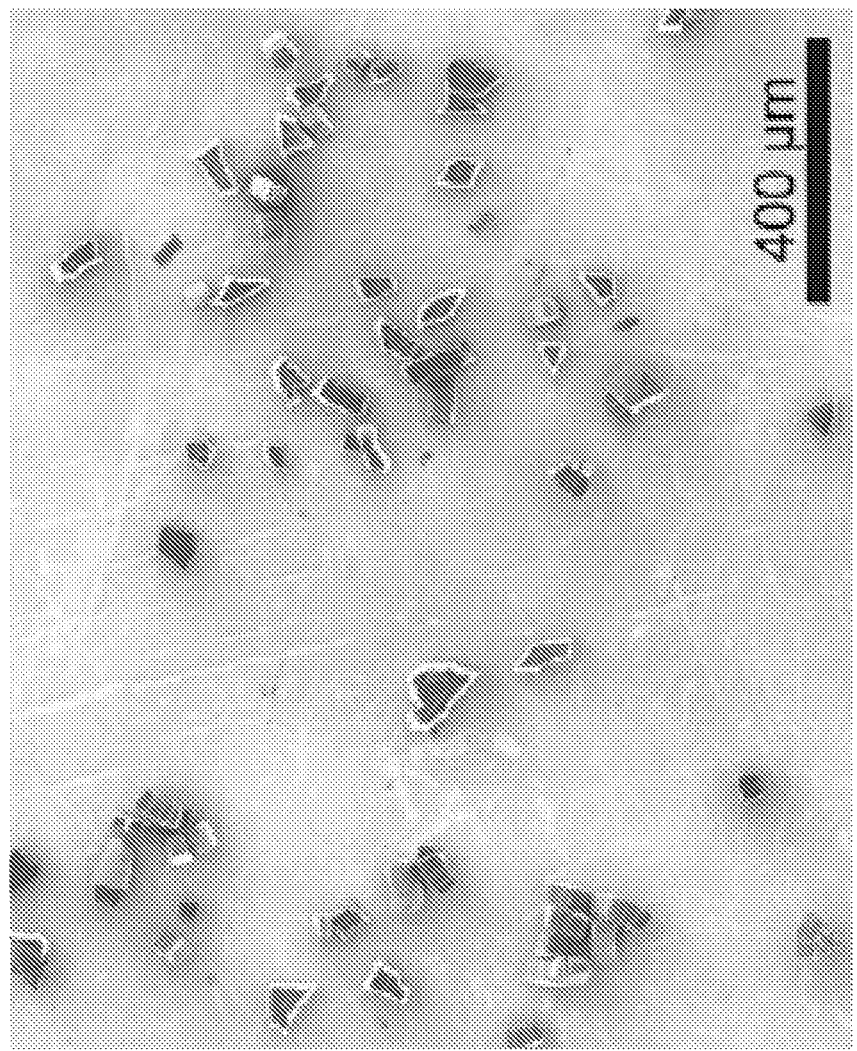
FIGS. 4B-4D show SEM images of carbon nanofiber particles of the invention at successively higher magnifications formed from a rugate filter porous silicon carbon composite.
Figure 4C:
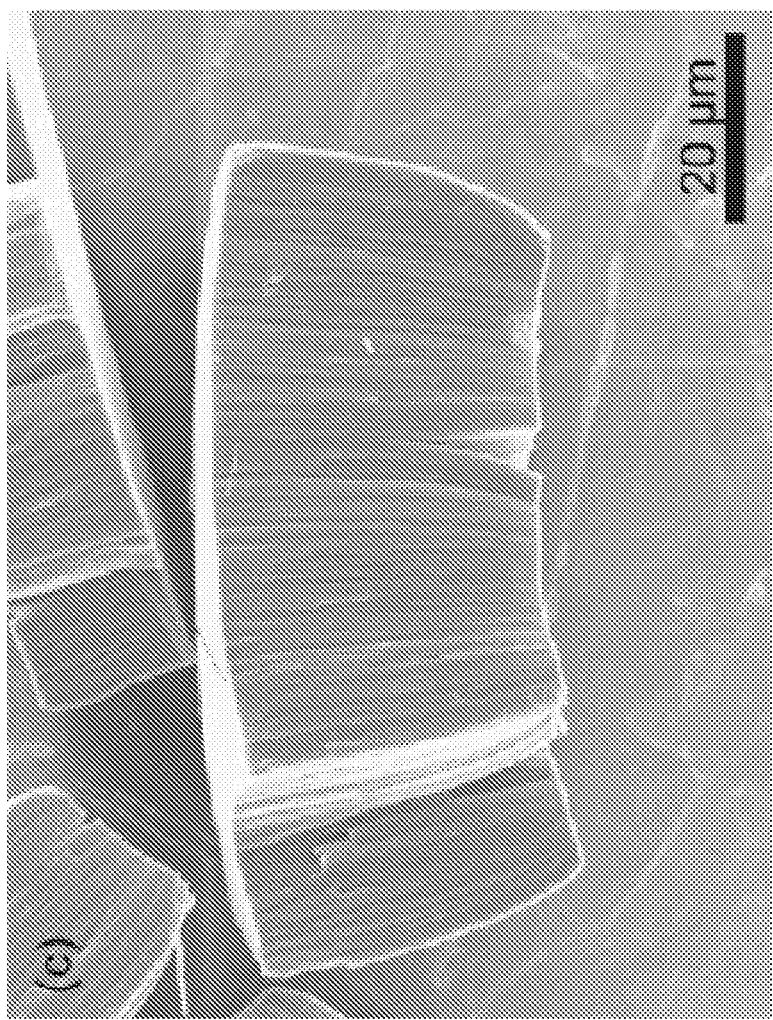
Figure 4D:
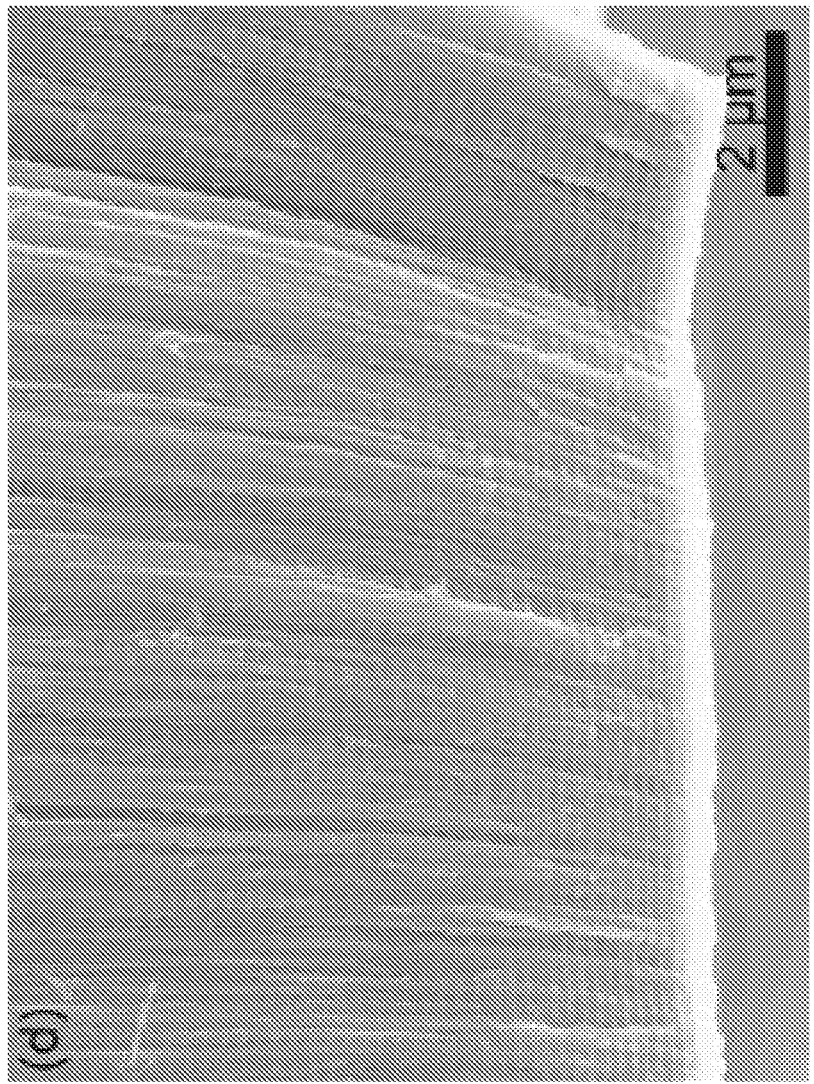
Figure 4E:
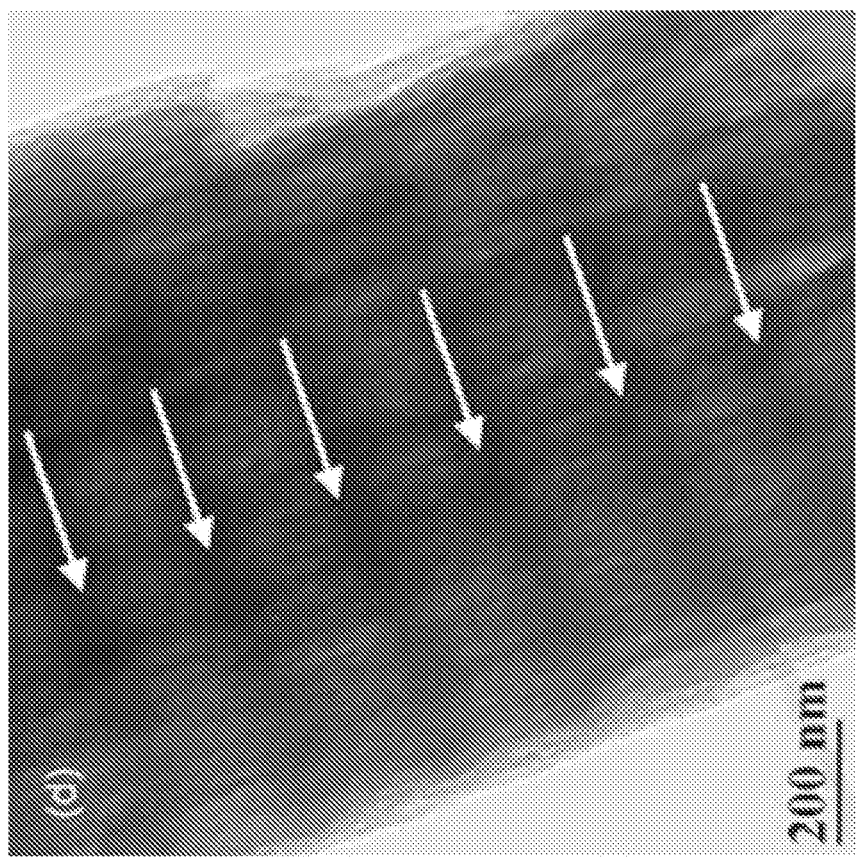
FIG. 4E shows a TEM image of a carbon nanofiber rugate particle of the invention.

FIG. 4B-4D show SEM images of carbon particles at successively higher magnifications formed from a rugate filter porous silicon carbon composite. FIG. 4E shows a TEM image of a carbon nanofiber particle, showing clear banding of the rugate filter. The carbon nanofiber particle is an array of nanofibers. The diameter of individual pores in the porous silicon template is ~7 nm, so the fibers observed in the SEM images are most likely aggregations, or bundles, of carbon nanofibers synthesized in adjacent pores. The images show no evidence of hollow nanotubes. The formation of carbon fiber bundles is likely due to the collapse of the carbon pore structure due to strong van der Waals interactions between the pore walls. The individual fibers then bundle into larger aggregates of ~100 nm in diameter, again due to strong attractive van der Waals forces. This gives rise to the more densely packed nanofiber membrane film in the SEM images.

Figure 4F:
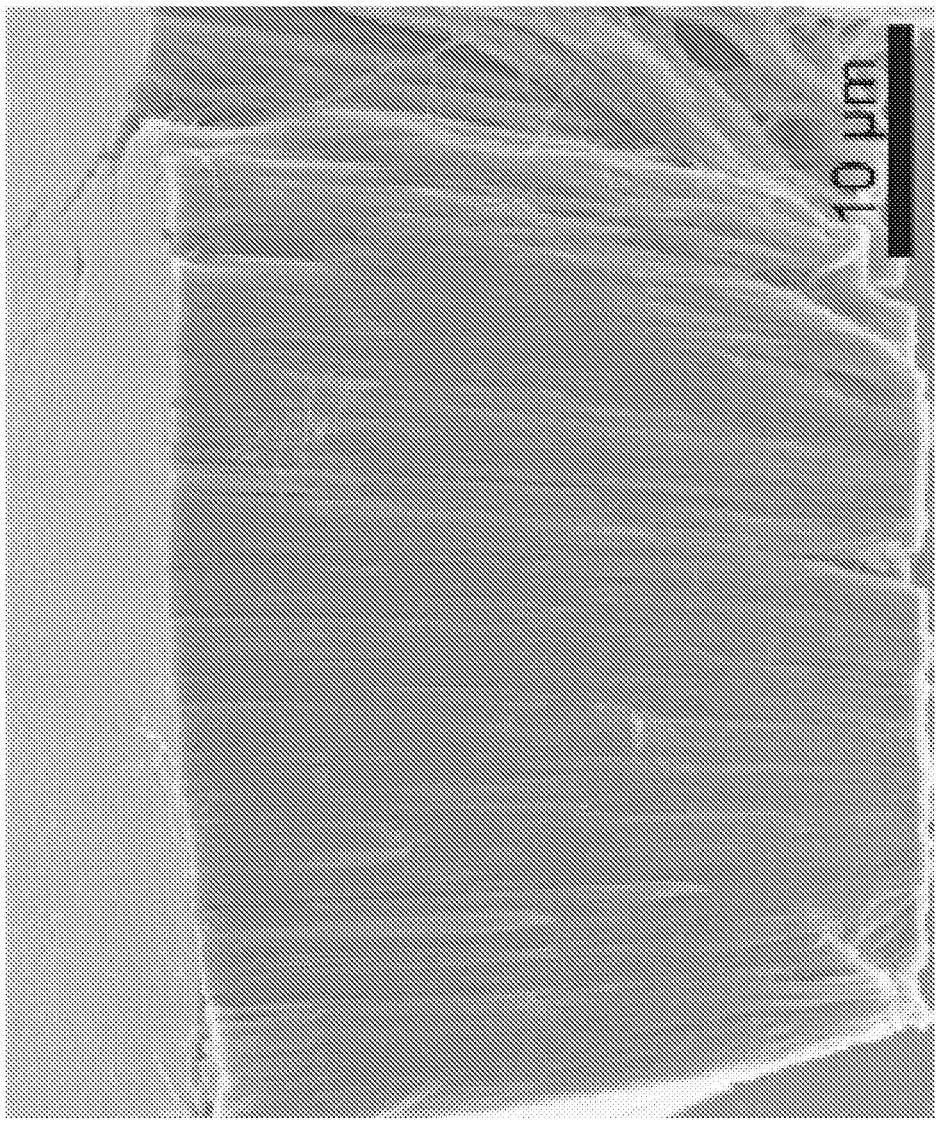
FIG. 4F shows an image of a single layer carbon nanofiber structure of the invention.
Figure 4G:
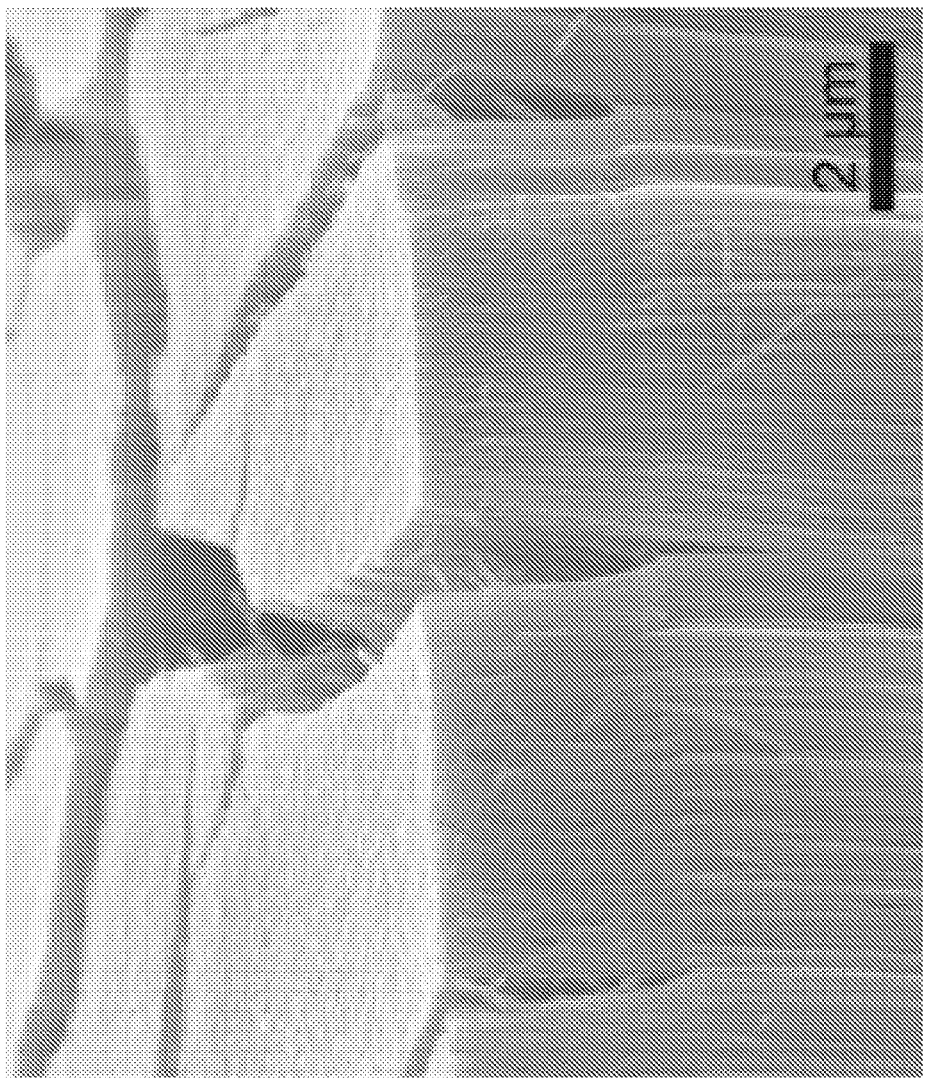
FIG. 4G shows an image of a single layer carbon nanofiber structure of the invention.

Carbon was also templated in other porous silicon structures, such as single and double layers. Electron microscopy images of the resultant carbon nanofiber array formed from a single layer of uniform diameter (~7 nm) pores do not show any of the horizontal banding observed in the rugate-templated particles, clearly demonstrating that the oscillating diameter of the templated carbon nanofibers in FIGS. 4B-4E is attributable to the periodic structure of the rugate porous silicon template, and that the structure of carbon nanostructured materials can be changed. FIG. 4F shows an image of one the single layer structure, which was produced using a porous silicon template formed from a constant etching current of 55 mA cm$^{-2}$ for 1200 seconds. Carbon nanofiber arrays were also synthesized in a two layer template structure consisting of a thick layer of large to diameter pores on top of a thin layer of smaller pores. The demarcation line of the two layers is clearly visible in the resultant carbon nanowire array, as seen in FIG. 4G. Thus, the porous silicon template provides direct control over the structure of carbon nanowire carbon material that is produced, providing the ability to produce a predetermined nanostructured carbon with extremely high structural fidelity.

The porous silicon films in the experimented demonstrated the ability of methods of the invention to utilize the films as template the formation of carbon nanostructures. The carbon surfaces behave as highly efficient adsorbents for volatile organic compounds such as toluene. When combined with the signal transduction capabilities of a porous photonic crystal, the films act as sensitive optical vapor sensors. While the films crack upon removal of the template removal and drying, the carbon nanofiber arrays can be handled while wet. The user-definable control of diameter exhibited by this synthetic route opens new applications of carbon fibers as nanostructural, nanoelectronic, or energy storage components.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for forming a nanostructured material, comprising:
   introducing a carbon precursor into the pores of a porous silicon film; and
   forming carbon from the carbon precursor in the pores of the porous silicon film to form a carbon-silicon nanostructured material, wherein said carbon precursor comprises liquid, carbon-containing, polymer precursor, and said forming comprises:
   thermally polymerizing the liquid, carbon-containing polymer precursor to form a carbon-containing polymer in the pores of the porous silicon film; and
   thermally carbonizing the carbon-containing polymer to produce the carbon-silicon nanostructured material.

2. The method of claim 1, wherein the liquid, carbon-containing, polymer precursor comprises oxalic acid in furfuryl alcohol.

3. The method of claim 2, wherein said introducing comprises immersing the porous silicon film in the liquid, carbon-containing, polymer precursor.

4. The method of claim 1, wherein said thermally carbonizing is conducted under flowing nitrogen.

5. The method of claim 1, further comprising a preliminary step of electrochemically etching a highly doped, p-type, silicon wafer, to create a porous silicon film and then oxidizing the porous silicon film.

6. The method of claim 5, wherein said oxidizing comprises oxidizing the porous silicon wafer in ozone.

7. A method of forming a free-standing carbon nanofiber array, comprising:
   performing the method of claim 1, and
   releasing the carbon from the nanostructured material by dissolving the porous silicon film to form the free-standing carbon nanofiber array.

8. A method of forming a free-standing carbon nanofiber array, comprising:
   introducing a carbon precursor into the pores of a porous silicon film;
   forming carbon from the carbon precursor in the pores of the porous silicon film to form a carbon-silicon nanostructured material, and
   releasing the carbon from the nanostructured material by dissolving the porous silicon film to form the free-standing carbon nanofiber array.

9. The method of claim 8, further comprising rinsing the carbon nanofiber array.

10. The method of claim 9, further comprising maintaining the carbon nanofiber array as a film in liquid.

11. The method of claim 8, further comprising drying the carbon nanofiber array to form carbon nanofiber particles.

12. The method of claim 8, wherein said releasing comprises soaking in a solution of dimethylsulfoxide, aqueous hydrofluoric acid, and ethanol.

13. A method for forming a nanostructured material, comprising:
   introducing a carbon precursor into the pores of a porous silicon film; and
   forming carbon from the carbon precursor in the pores of the porous silicon film to form a carbon-silicon nanostructured material, wherein said introducing comprises filling the pores of the porous silicon with a solution of oxalic acid in furfuryl alcohol, followed by thermal polymerization of the furfuyl alcohol and carbonization of a resultant poly(furfuryl alcohol) resin to form the carbon-silicon nanostructured material with carbon in the pores of the porous silicon.

14. A method for forming a free-standing carbon nanofiber array, comprising:
   introducing a carbon precursor into the pores of a porous silicon film;
   forming carbon from the carbon precursor in the pores of the porous silicon film to form a carbon-silicon nanostructured material, wherein said introducing comprises filling the pores of the porous silicon with a solution of oxalic acid in furfuryl alcohol, followed by thermal polymerization of the furfuyl alcohol and carbonization of a resultant poly(furfuryl alcohol) resin to form the carbon-silicon nanostructured material with carbon in the pores of the porous silicon; and
   further comprising releasing a free standing carbon nanofiber array by dissolving the porous silicon in solution.

15. The method of claim 14, further comprising rinsing the carbon nanofiber array.

16. The method of claim 15, further comprising maintaining the carbon nanofiber array as a film in liquid.

17. The method of claim 14, further comprising drying the carbon nanofiber array to form carbon nanofiber particles.

18. The method of claim 14, wherein said releasing comprises soaking in a solution of dimethylsulfoxide, aqueous hydrofluoric acid, and ethanol.

19. The method of claim 14, wherein the porous silicon film comprises an oxidized porous silicon film.

20. The method of claim 19, comprising a preliminary step of ozone oxidizing a freshly etched porous silicon film to form the oxidized porous silicon film.

* * * * *